US006965694B2

(12) United States Patent
Ueda et al.

(10) Patent No.: US 6,965,694 B2
(45) Date of Patent: Nov. 15, 2005

(54) MOTION INFORMATION RECOGNITION SYSTEM

(75) Inventors: Yugo Ueda, Wako (JP); Hiroshi Tsujino, Wako (JP)

(73) Assignee: Honda Giken Kogyo Kabushiki Kaisa, Tokyo (JP)

( * ) Notice: Subject to any disclaimer, the term of this patent is extended or adjusted under 35 U.S.C. 154(b) by 734 days.

(21) Appl. No.: 09/996,307

(22) Filed: Nov. 27, 2001

(65) Prior Publication Data

US 2002/0126897 A1 Sep. 12, 2002

(30) Foreign Application Priority Data

Dec. 1, 2000 (JP) ........................................ 2000-366498

(51) Int. Cl.[7] .............................................. G06K 9/48
(52) U.S. Cl. ....................................................... 382/197
(58) Field of Search ................................ 382/103, 107, 382/118, 159, 181, 190, 197, 209, 218, 224, 236, 296, 305; 348/169, 402.1, 407.1, 418.1, 418; 375/240.16

(56) References Cited

U.S. PATENT DOCUMENTS

| | | | | |
|---|---|---|---|---|
| RE36,041 E | * | 1/1999 | Turk et al. ................... | 382/118 |
| 6,157,677 A | * | 12/2000 | Martens et al. ......... | 375/240.16 |
| 6,292,575 B1 | * | 9/2001 | Bortolussi et al. .......... | 382/118 |
| 6,526,156 B1 | * | 2/2003 | Black et al. ................. | 382/103 |
| 6,681,032 B2 | * | 1/2004 | Bortolussi et al. .......... | 382/118 |
| 6,819,782 B1 | * | 11/2004 | Imagawa et al. ........... | 382/115 |

FOREIGN PATENT DOCUMENTS

| | | | |
|---|---|---|---|
| EP | 0613101 A2 * | 8/1994 | ............ G06K/9/62 |
| JP | 11-25269 | 1/1999 | |

OTHER PUBLICATIONS

Lee, et al. "Face detection and recognition using PCA", IEEE, pp. 84–87, 1999.*
Turk, et al. "Face recognition using eigenfaces", IEEE, pp. 586–591, 1991.*
King, et al. "Localized principal component analysis learning for face feature extraction and recognition", Proceedins to the workshop on 3d computer vision, pp. 124–128, 1997.*
Nagaya, et al. "A theoretical consideration of pattern space trajectory for gesture spotting recognition", IEEE, pp. 72–77, 1996.*
Retrieving Extracting the Posture of an Object From the Distance Image Based on the Elgenspace Lookup—Virtual Distant Image Generation Using Shape Models (Japanese article, English abstract).
3D Object Recognition from Appearance—Parametric Eigenspace Method (Japanese article, English abstract).

* cited by examiner

*Primary Examiner*—Daniel Miriam
(74) *Attorney, Agent, or Firm*—Fenwick & West LLP

(57) ABSTRACT

A motion information recognition system takes time-series images of an object in motion and generates image vectors that are analyzed to produce a plurality of eigenvectors that are then stored. Inner product operations are performed between image vectors of a recognized object and a plurality of the stored eigenvectors for obtaining the motion information of the recognized object based on the result of said inner product operations to provide high-speed and easy motion information recognition at reduced computing cost.

12 Claims, 6 Drawing Sheets

MOTION INFORMATION RECOGNITION SYSTEM

TECHNICAL FIELD

This invention relates to an image recognition system and, in particular, to motion information recognition system capable of recognizing the rotating movement of an object or the system by using only input images as the sensor information.

BACKGROUND OF THE INVENTION

One important and essential technology in the feedback system using images or the visual support for autonomous moving robots is a technique for recognizing the motion information of an object within the environment. By such motion recognition technique, it becomes possible to detect the posture or the motion amount of the system or robot relative to a still object.

In some conventional motion recognition techniques that utilize two-dimensional images, the object is recognized from two-dimensional images which have been taken in time series and the direction and/or the posture of the object is judged to detect the speed of the object. Those conventional recognition techniques can be broadly classified into method based on comparison with geometrical models and method based on looking up images.

In the first method, the geometric model of the object is pre-stored and the structural analysis is performed on the obtained images of the object. Then the image is compared to the stored geometric model to recognize the object. In this method, it is difficult to exactly model the object for the complicated shape of the object. Another problem is that the complication of the geometric model increases the computing cost significantly.

On the other hand, the second method has an advantage that the computing cost is not dependent on the complicated shape of the object because images of the object in the various states is pre-stored and stored images are compared to the taken images. However, since in the method a large amount of various images are need to pre-stored as templates for the image lookup, a large amount of the storage capacity is required.

Many approaches for resolving these problems have been developed. One of those approaches is a technique in which the image lookup is performed by utilizing principal component analysis (PCA). Using the PCA, a plurality of variables that are correlated each other may be combined (or compressed) to generate a smaller number of the variables. Thus, in the image lookup using the PCA, various images to be used for the lookup may be compressed into eigenvectors, reducing the data amount to be stored.

An example of the conventional techniques using such PCA are disclosed in the article by Murase et al, entitled "3D Object Recognition from Appearance-Parametric Eigenspace Method", Electro Information Communication Association D-II, Vol. J77-D-II, No. 11, pp 2179–2187, 1994/9. According to the above-referenced article, it is possible to store a 3-dimensional object as a set of 2-dimensional images in a less volume of the storage capacity using the PCA.

Other object recognition techniques using the similar eigenspace are disclosed in the article of Amano et al, titled "Retrieving Extracting the posture of an object from the distance image based on the eigenspace lookup-virtual distant image generation using shape models", Image Lab Vol. 9, No, 1, 10–14, and in the Japanese Patent Publication No. H11-25269 by Kataoka et al, entitled "Apparatus and method for recognizing a face image".

The aforementioned techniques using the PCA, however, are intended to recognize the direction or the posture of the object from taken images but not intended to recognize the motion information (motion direction and speed, for example) of the object directly by using the eigenspace. Thus, to recognize the motion information of the object in the aforementioned techniques, the direction or the posture must be recognized for each image and then the motion information of the object must be judged based on the recognition result. With such techniques the complication as well as the cost of computing tend to increase.

Therefore, it is objective of the invention to provide a high-speed and simple motion information recognition system that can reduce the required storage capacity and computing cost by obtaining the motion information directly from the images.

SUMMARY OF THE INVENTION

A system for recognizing motion information of an object according to one aspect of the invention comprises: an imager for taking time-series images of an moving object; image capture means for capturing said time-series images of said object to generate image vectors,; a primary component analyzer for obtaining, through principal component analysis, a plurality of eigenvectors of the image vectors of a sample object which are generated by said image capture means; a storage for storing said plurality of eigenvectors; inner product means for performing inner product operations between the image vectors of a recognized object which are generated by said image capture means and said plurality of eigenvectors stored in said storage means; and calculation means for obtaining the motion information of said recognized object based on the result of said inner product operations. Because the motion information of the object is obtained directly from the eigenvectors, the system can provide a high-speed and simple motion information recognition and can reduce the required computing cost.

According to one aspect of the invention, the image vectors of the sample object and the image vectors of the recognized object are generated from at least two images which are successive in terms of time. Thus the accuracy of the motion information recognition can be improved because the speed of the recognized object can be represented by one image, into which at least two successive images are combined.

According to another aspect of the invention, the system for recognizing the motion information further comprises selection means for selecting the largest eigenvalue for a first eigenvector and the second largest eigenvalue for a second eigenvector. Since the two of best eigenvectors, among the plurality of eigenvectors, are selected which contain the feature and the motion information of the sample object most appropriately, the system can decrease the required computing amount as well as the required storage capacity.

Other aspects and embodiments of the invention will be apparent in the following description with reference to the attached drawings.

DETAILED DESCRIPTION OF THE PREFERRED EMBODIMENTS

Figure 1:
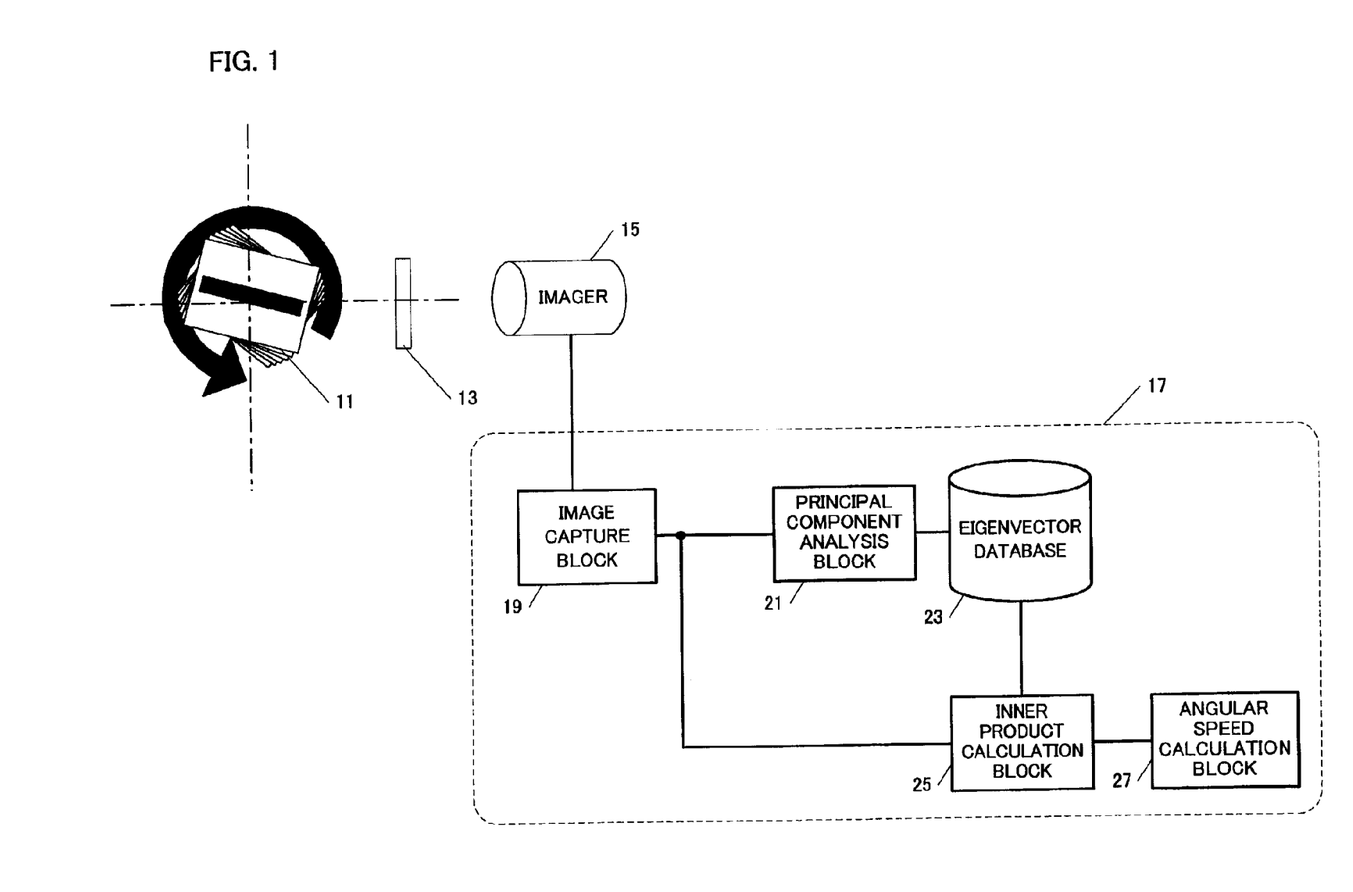
FIG. 1 shows a block diagram of one embodiment according to the invention.

One embodiment of the invention will be described with reference to the accompanying figures. FIG. 1 illustrates an exemplary embodiment of a motion information recognition system according to the invention. The motion information recognition system comprises an imager 15, which takes images of an object successively in a high speed to transmit image signals of the taken images to the data processing block 17. The data processing block 17 then processes the signals transmitted from the imager 15 to obtain the motion information of the object 11. The data processing block 17 is typically implemented by a general-purpose computer or a workstation.

One example of the imager 15 is a conventional high-speed video camera that is capable of taking time-series images of an object in a high speed. The imager 15 takes some images of the object for every predetermined sampling interval (for every 4 milliseconds, for example) to generate time-series images of the object. The time-series images generated by the imager 15 are transmitted in a form of either digital or analog image signals as image signals to the data processing block 17 through any conventional interfacing means.

The data processing block 17 for processing the image signals transmitted from the imager 15 comprises an image capture block 19, a principal component analysis (PCA) block 21, an eigenvector database 23, an inner product calculation block 25 and an angular speed calculation block 27. Connected to the imager 15 is the image capture block 19, which receives image signals from the imager 15 and generate image data to be used for later calculations. The PCA block 21 performs principal component analysis on images in a learning process (described later) to obtain eigenvalues and eigenvectors. The eigenvector database 23 stores the eigenvalues and eigenvectors obtained from the images as database. The inner product calculation block 25 performs inner product operations between the images in a recognition process (described later) and two eigenvectors stored in the database. The angular speed calculation block 27 calculates the angular speed based on two correlation values obtained from the inner product calculations operations.

The motion information recognition system according to the invention recognizes the motion information of an object through two processes, a learning process and a recognition process. As used herein, an object to be used as a sample in the learning process will be referred to as "sample object" and an object that should be recognized in terms of its motion information in the recognition process will be referred to as "target object". In this system according to the invention, the motion information of a "sample object" is learned in advance in the learning process and the motion information of a "target object" is obtained from the learned motion information. Thus, the ability of the motion information recognition of the system may depend on the images of the sample object used as a sample in the learning process. However, once the images of the sample object, including its motion information, have been learned with the motion information of the object, the images of the recognized object used in the recognition process may be different from the images of the sample object used in the learning process. The motion information in this embodiment primarily relates to the rotating motion (i.e., angular speed and direction of rotation).

The learning process is a process for generating and storing eigenvectors to be used in the recognition process for obtaining the motion information of a recognized object. In the learning process, sample images of a sample object are acquired and principal component analysis are performed on those time series image samples to obtain eigenvalues and eigenvectors, which are stored in the eigenvector database. The recognition process is a process for recognizing the motion information of a target object by using the eigenvalues and eigenvectors generated in the learning process. In the recognition process, inner product is calculated between the time-series images of the recognized object and the stored eigenvectors, and then the angular speed and the rotation direction of the recognized object is calculated from the resulting inner product.

An object shown in FIG. 1 is an example of a recognized sample object as well as a sample target object in this system. These objects may be any form as long as they have such form characteristic that the rotating movement can be distinguished within their images. To simplify the explanation, it is assumed that the objects have such a simple pattern as shown in FIG. 1 and that the same pattern is used both in the learning and recognition processes. Patterns 11 in FIG. 1 represents a front view of an object rotated by a motor (not shown). Rotation speed of the object is variably controlled by the motor. Pattern 13 represents the side view of the same object 11, located oppositely to the imager 15. A motor is connected to the object 11 for variably controlling its rotation speed.

The system of the invention is capable of recognizing not only the angular speed but also the stationary state (that is, angular speed is zero) of the object according to the learned information in the aforementioned learning process. The system is also capable of recognizing the rotation direction. In this embodiment, the range of the angular speed is set from 0 rpm to 326 rpm. The angular speed that can be recognized in this embodiment is assumed to be in a range of 0 rpm through 326 rpm. Thus, the rotation information corresponding to such range is learned in advance for the object 11 by the system. Now the learning process in this embodiment will be explained in detail.

The learning process starts with taking images of a sample object. The image of the sample object 11 that is rotating relatively to the imager 15 is taken for every predetermined sampling time. The sampling time may be fixed constant regardless of the angular speed of the sample object 11, but must be set much shorter than the rotation cycle of the sample object enough to acquire a sufficient number of images for calculating the angular speed. The sampling time is set to 4 millisecond (msec) in this embodiment, so 250 pieces of images per second can be obtained per second. Because the angular speed range for the recognized object is determined from 0 rpm to 326 rpm, the sampling time of 4 milliseconds enables to acquire a sufficient number of images.

Figure 2:
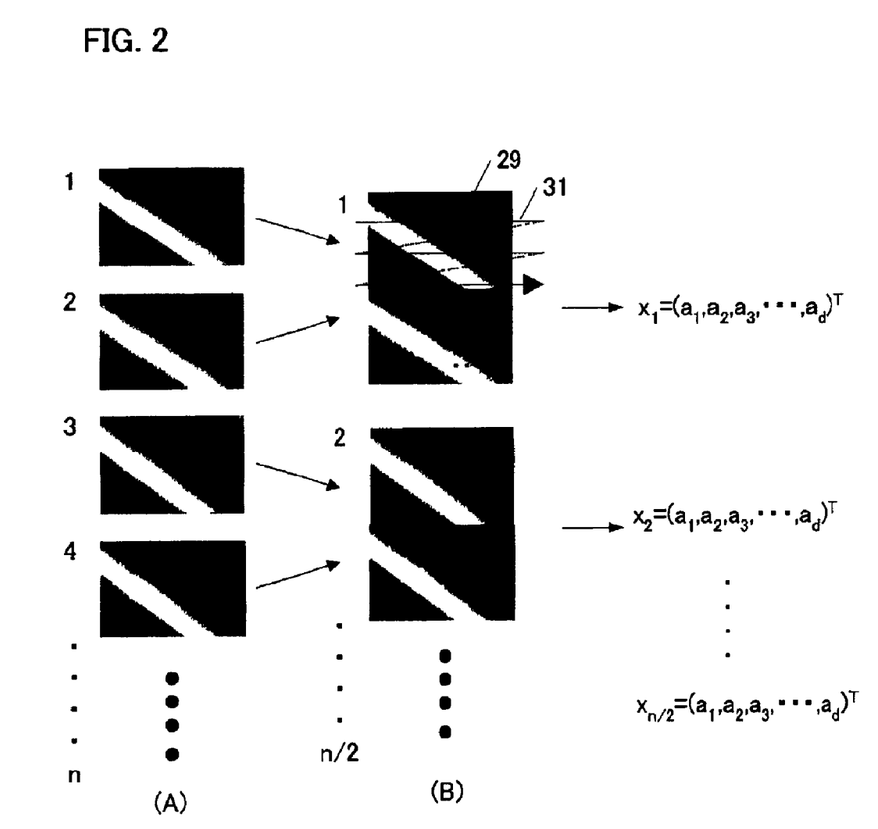
FIG. 2 shows an example of time-series images processed by the system for recognizing the motion information according to the invention.

In this embodiment, in order to correspond to the above-mentioned angular speed range for the recognized object, the rotating motion of the sample object 11 is taken at ten exemplary rotating speed stages in the range of 0 rpm to 326 rpm (specifically, 23, 46, 69, 92, 118, 142, 167, 190, 213 and 326 rpm) corresponding to the angular speed range of the object. Since 340 time-series images are taken for every 4 msec at each stage, total 3400 images are obtained. These 3400 time-series images that have been taken at these ten stages are used for the principal component analysis in the learning process. FIG. 2(A) illustrates an example of such obtained time-series images where the total number of the generated time-series images is represented by n (n=3400 in this embodiment).

These n images are processed for the later calculation in the image capture block 19 of the data processing block 17. Each two successive images of the n images are paired and then two images of each pair are combined into one image as illustrated in FIG. 2(B). In FIG. 2(B), every time successive two images are combined into one image, resultingly total n/2 pieces of images are produced. In this embodiment, since 3400 images are initially used, these 3400 images are combined into total 1700 images. Thus, since the speed difference between two images is represented in one image by combining two successive images, the accuracy of the correlation can be improved, which will be described later.

A format of the images combined in the image capture block 19 is a raster image. Each pixel has a pixel value representing the image information at the position within the image. In this embodiment in FIG. 2, there are 3072 pixels in total within one combined image and each pixel value is represented by a gray-scale.

When total number of the pixels within one combined image is denoted by d and that each pixel value is denoted by $a_m$, one image may be represented by a d-dimensional vector containing each pixel value as a vector element in such sequence as shown by the arrow 31 in FIG. 2. Accordingly, the m-th image representing the rotating motion of the object at a given time t may be represented by the vector shown in the following equation (1):

$$x_m = (a_1, a_2, \ldots, a_d)^T \quad (1)$$

where T represents a transposition matrix.

Hereinafter, such image that has been pre-processed to be used for the learning process will be referred to as "learned image" and a d-dimensional vector that has been generated from a learned image will be referred to as "learned image vector". Thus, in this embodiment, 1700 pieces of 3072-dimensional learned image vectors are generated from 1700 pieces of learned images representing the rotating motion of the object at the time t.

After the learned images are obtained and the learned image vectors are generated, principal component analysis is then performed by the principal component analysis block 21 in the learning process. Performing the principal component analysis will derive eigenvectors for use in the inner product calculations which will be described later. Now the principal component analysis will be explained in detail.

At first, all learned image vectors are normalized in terms of image brightness according to the following equation (2).

$$\tilde{x} = \frac{x}{\|x\|} \quad (2)$$

This normalization is performed for removing influence of brightness in each image as much as possible. When the number of the learned image vectors is denoted by j (that is, j=n/2), an average image vector c is calculated from the j pieces of normalized learned image vectors by the following equation (3):

$$c = \frac{1}{j} \sum_{i=1}^{j} \tilde{x}_i \quad (3)$$

Then, differences between each of the normalized learned image vectors and the average image vector c are calculated by the following equation (4).

$$X_i = \tilde{x}_i - c \quad i=1,2,\ldots,j \quad (4)$$

These differences will be used as each element in the matrix X in the following equation (5).

$$X = (X_1, X_2, X_3, \ldots, X_j) \quad (5)$$

The covariance matrix Q of the set of learned image vectors is calculated using this matrix X by the following equation (6):

$$Q = X \cdot X^T \quad (6)$$

This covariance matrix Q will be used to form an eigen-equation as shown in the following equation (7).

$$\lambda_1 e_1 = Q e_1 \quad (7)$$

Solving the equation (7) yields eigenvectors (e1, e2, ..., ej) corresponding to j pieces of eigenvalues ($\lambda_1 > \lambda_2 > \ldots > \lambda_j$). An eigenspace of the learned image vectors can be obtained by employing the eigenvectors as basis vectors.

The largest eigenvalue among the j pieces of eigenvalues is defined as a first eigenvalue $\lambda_1$ and an eigenvector corresponding to the first eigenvalue is defined as a first eigenvector $e_1$. Likewise, the second largest eigenvalue is defined as second eigenvalue $\lambda_2$ and an eigenvector corresponding to the second eigenvalue is defined as a second eigenvector $e_2$. Like this way, 1700 pieces of eigenvalues and corresponding 1700 pieces of eigenvectors are obtained from this principal component analysis in the embodiment.

Each of the eigenvectors thus obtained from the learned image vectors contains in a compressed format the characteristic and the motion information of the sample object in the original leaning image. Therefore, it is possible to reduce the required storage capacity significantly by selecting some eigenvectors from those eigenvectors and using only the selected eigenvectors for the motion information recognition purpose. The system of the invention is capable of recognizing the motion information of the recognized object by learning in advance the motion information regarding the sample object image as eigenvectors and performing the inner product operation on those eigenvectors directly with the image of the recognized object.

Now a method for selecting from a plurality of eigenvectors the eigenvectors to be used in the recognition process will be explained.

Figure 3:
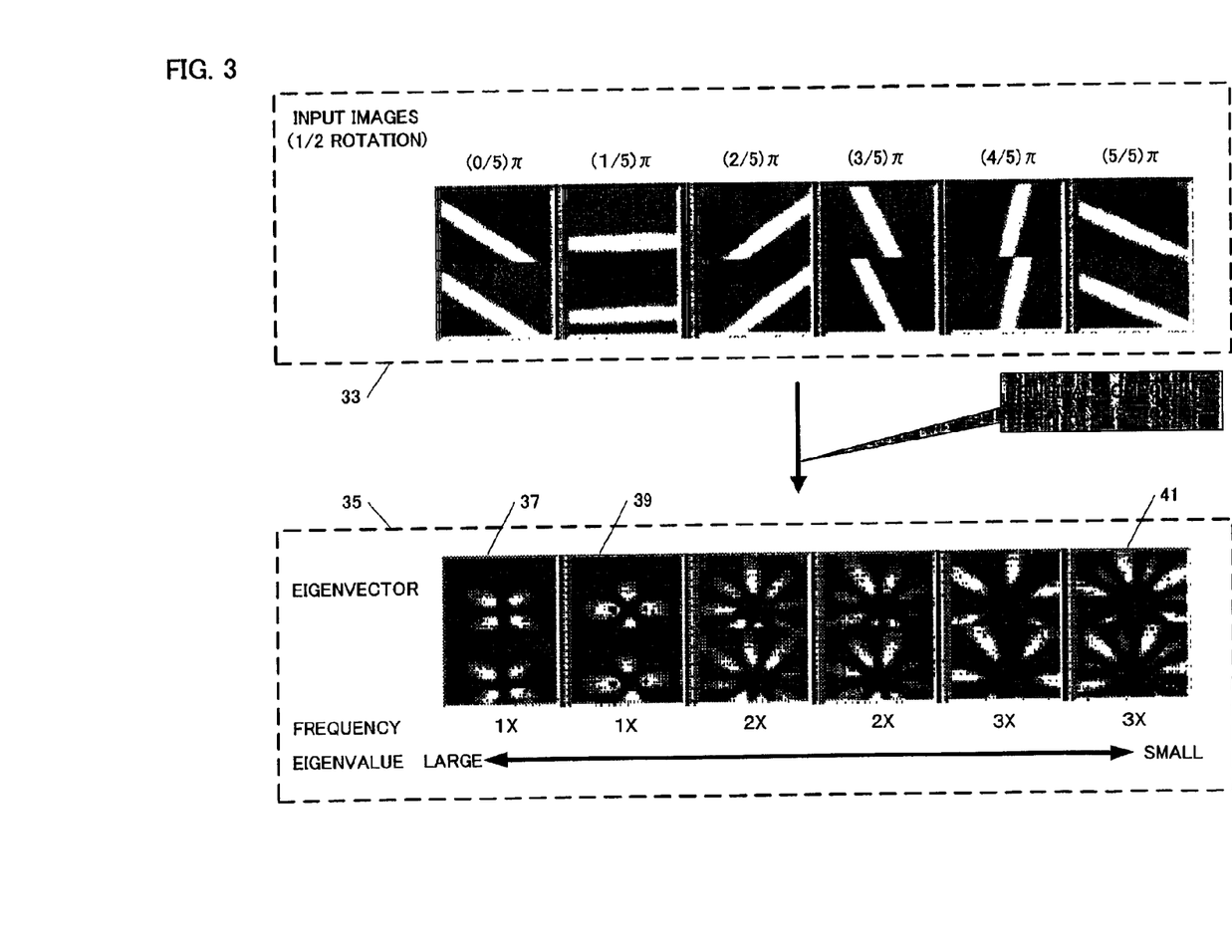
FIG. 3 shows an example of learned images and the eigenvectors obtained from the learned images.

FIG. 3 illustrates examples of the learned images 33 used in this embodiment and the eigenvectors 35 obtained from those learned images. The eigenvectors 35 represented as two-dimensional images are arranged from the left side in a descending sequence of their eigenvalues. The two-dimensional representations for the eigenvectors look like flowers as seen in FIG. 3. It is considered that the number of the flower petals indicates a frequency of the eigenvector. As seen, as the eigenvalues become larger, the respective frequencies represented by the eigenvector become lower (that is, the number of the flower petals of the eigenvector 37 having the larger eigenvalue is less than that of the flower petals of the eigenvector 41 having the smaller eigenvalue). In addition, the eigenspaces having the same frequency are orthogonal and adjacent each other (that is, the numbers of the flower petals of the eigenvector 37 and the eigenvector 39 which are adjacent each other are same but the directions are rotated). However, the phase of which eigenvector is advancing relative to the other is not depend on the eigenvalue.

The eigenvector representing the lower frequency can represent a wider range of frequencies than the eigenvector representing the higher frequency. Therefore, it is advantageous to use two eigenvectors representing the lowest frequencies for calculating the angular speed. In other words, first eigenvector corresponding to the first eigenvalue and second eigenvector corresponding to the second eigenvalue are used for calculating the angular speed.

In this embodiment, the sizes of the 1700 pieces of eigenvectors obtained from the PCA are compared to select the first and second eigenvalues. The first eigenvector 37 corresponding to the first eigenvalue and the second eigenvector 39 corresponding to the second eigenvalue are calculated. The first eigenvector 37 and the second eigenvector 39 are stored in the eigenvector database 23 for the calculation in the recognition process. The information amount of the eigenvector database 23 obtained in such way is 2×d (2×3072), which is reduced significantly in size in comparison with the original information amount j×d (1700×3072).

Now, the recognition process will be explained in detail. In the recognition process, the eigenvectors pre-stored in the eigenvector database are used to recognize the motion information of the recognized object that is taken by the imager 15. Thus, the object to be recognized in the recognition process has the same form characteristics as the sample object which was learned in the learning process, and the recognizable motion information is the one corresponding to the image of the sample object on which the learning process has been performed.

In this embodiment, as a recognized object, the same object as the sample used in the learning process, but the images used therein are different from those used in the learning process. Accordingly, the recognized images used in the recognition process are different from those used in the learning process in terms of brightness and/or noise of images. The system according to the invention has an advantage that it is not so much influenced by such image taking conditions because it learns the learned images as eigenvectors.

At first, in the recognition process, some time-series images of a recognized object with any rotating motion are generated by the imager. These images are processed in a series of stages through the imager 15 to the image capture block 19 in the same manner as in the learning process, and resultantly they are of the same format as in the learned images. That is to say, the images of the recognized object 11 are created for every predetermined sampling time by the imager 15, and then those images are sent to the image capture block 19, where each pair of images which are contiguous in terms of time are combined into one image, which is represented by a d-dimensional vector. These images and image vectors thus obtained should be referred to as "recognized images" and "recognized image vectors" respectively so as to distinguish from the learned images and the learned image vectors in the learning process. These recognized image vectors are sent from the image capture block 19 to the inner product calculation block 25.

The inner product calculation block 25 retrieves the first and second eigenvectors e1, e2 from the eigenvector database and the recognized image vectors from the image capture block 19, and performs inner product calculations between the recognized eigenvectors and the first eigenvector e1 and the second eigenvector e2 respectively. Here, assume that a recognized image vector of an image generated at a certain time t is represented by $x_t$, and that the result of the inner product calculation between the recognized image vector and the first eigenvector e1 is represented by a first correlation value $g_1(t)$ and the result of the inner product calculation between the recognized image vector and the second eigenvector e2 is represented by a second correlation value $g_2(t)$. Then, the first correlation value $g_1(t)$ and the second correlation value $g_2(t)$ can be represented by the following equations (8) respectively.

$$g_1(t)=e_1 \cdot x_1 \tag{8}$$

$$g_2(t)=e_2 \cdot x_1$$

Figure 4:
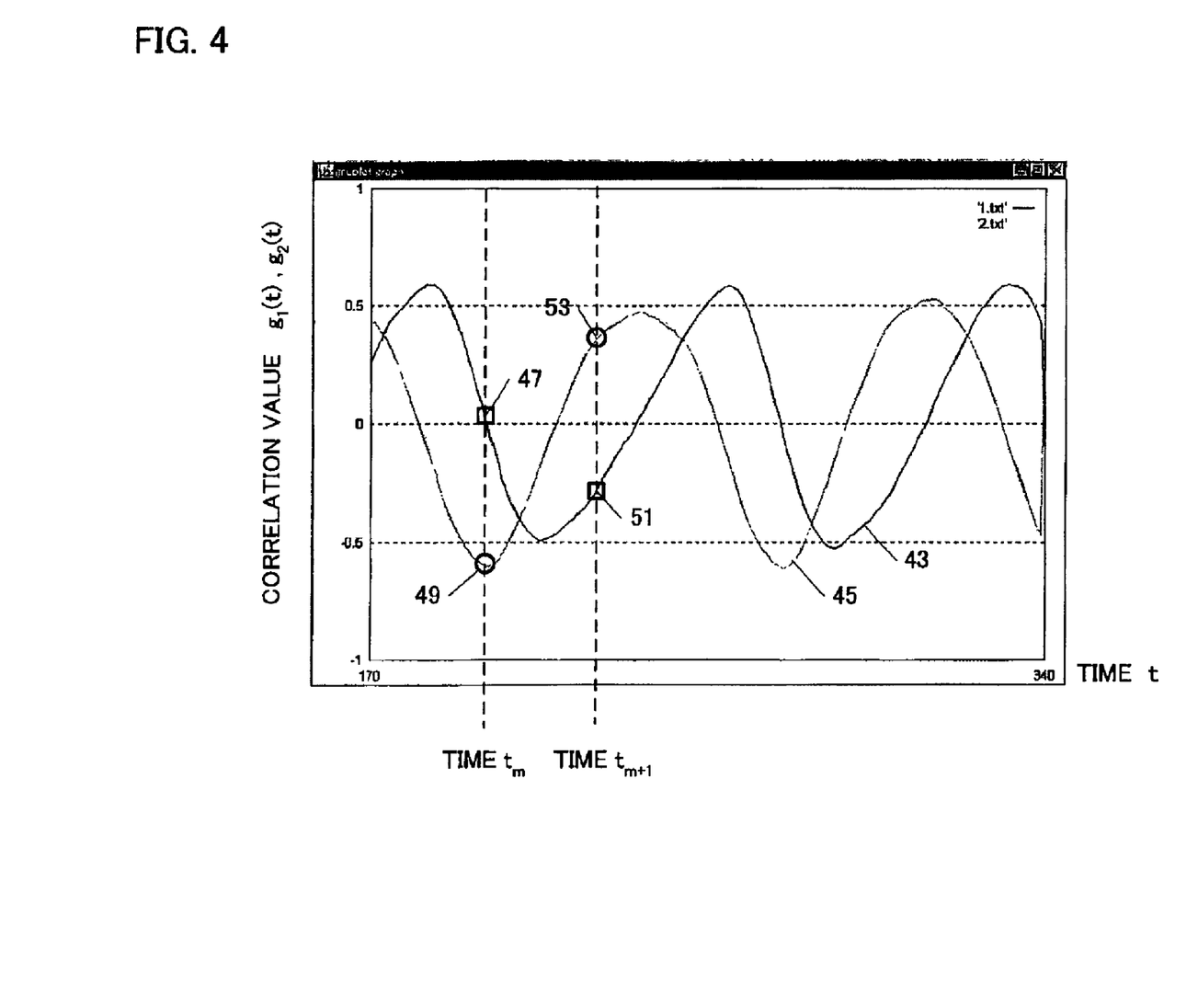
FIG. 4 is a graphical chart in which correlation values $g_1(t)$ and $g_2(t)$ are plotted to the time t.

FIG. 4 is a graph of which a horizontal axis indicates time t and a vertical axis indicates the correlation values $g_1(t)$, $g_2(t)$ to the first and second eigenvalues. More specifically, the result of the inner product of the first eigenvector $e_1$ and the m-th recognized image vector of the image generated correspondingly to the time $t_m$ is plotted on the graph (see 47 in FIG. 4), and the result of the inner product of the second eigenvector $e_2$ and the same m-th recognized image vector is plotted (see 49 in FIG. 4). Likewise, the results of the inner product of the (m+1)-th image corresponding to the time $t_{m+1}$ are plotted on the graph (51, 53). In this embodiment, 1700 correlation values $g_1(t)$, $g_2(t)$ corresponding to the time t are plotted on the graph.

The first correlation values 43 and the second correlation values 45 thus plotted on the graph may be regarded as cycle functions in which their phases are shifted by 90 degrees relative to each other as apparently seen in FIG. 4. Therefore, these correlation values are approximated using the trigonometric functions.

As described above, which eigenvector is advancing its phase relative to that of the other may not depend on which eigenvalue is larger or smaller. In other words, which correlation value, the first or the second, is advancing its phase relative to that of the other may not be determined only from their relationship in size of the eigenvalue. Thus, a plurality of the first and the second correlation values are calculated to determine which phase is delayed. The correlation values which are determined to be delayed are represented by sin(ωt) and the other ones are represented by cos(ωt), where ω denotes an angular speed.

In the graph shown in FIG. 4, the phase of the first correlation values 43 is delayed by 90 degrees against the second correlation values 45. So each eigenvalues can be approximated by the following equations (9).

$$g_1(t)=\sin(\omega t) \tag{9}$$

$$g_1(t)=\cos(\omega t)$$

On the contrary, when the phase of the first correlation values is advanced by 90 degrees against the second correlation values, each correlation values are represented by the following equations (10).

$$g_1(t)=\cos(\omega t) \tag{10}$$

$$g_2(t)=\sin(\omega t)$$

In general, the time differential of sin((ωt) is represented by equation (11), so the angular speed ω may be represented by equation (12).

$$\frac{d}{dt}\sin(\omega t) = \omega\cos(\omega t) \quad (11)$$

$$\omega = \frac{d}{dt}\sin(\omega t)/\cos(\omega t) \quad (12)$$

Substituting of the equations (9) or the equations (10) into the equation (12) yields the following equation (13) or (14).

$$\omega = \frac{d}{dt}g_1(t)/g_2(t) \quad (13)$$

$$\omega = \frac{d}{dt}g_2(t)/g_1(t) \quad (14)$$

Thus, the angular speed ω at the time t can be obtained from the gradient of $g_1(t)$ and $g_2(t)$ at the time t. The angular speed calculation block 27 receives the correlation values $g_1(t)$, $g_2(t)$ as the calculation results from the inner product calculation block 25 and determines which phase is delayed. The block 27 then selects either the equation (13) or the equation (14), to calculate the angular speed ω.

In this embodiment shown in FIG. 4, at the inner product calculation block 25, the inner product of the first eigenvector and the second eigenvector are calculated in terms of the 1700 pieces of recognized image vectors, and resultingly the 1700 pieces of first correlation values $g_1(t)$ and the 1700 pieces of second correlation values $g_2(t)$ are obtained respectively. At the angular speed calculation block 27, it is determined that the phase of the first correlation values are delayed relative to the phase of the second correlation values and the equation (13) is selected. Then the gradient of the first correlation values $g_1(t)$ is calculated, and the calculated gradient is divided by the second correlation values $g_2(t)$ to obtain the angular speed ω.

Figure 5:
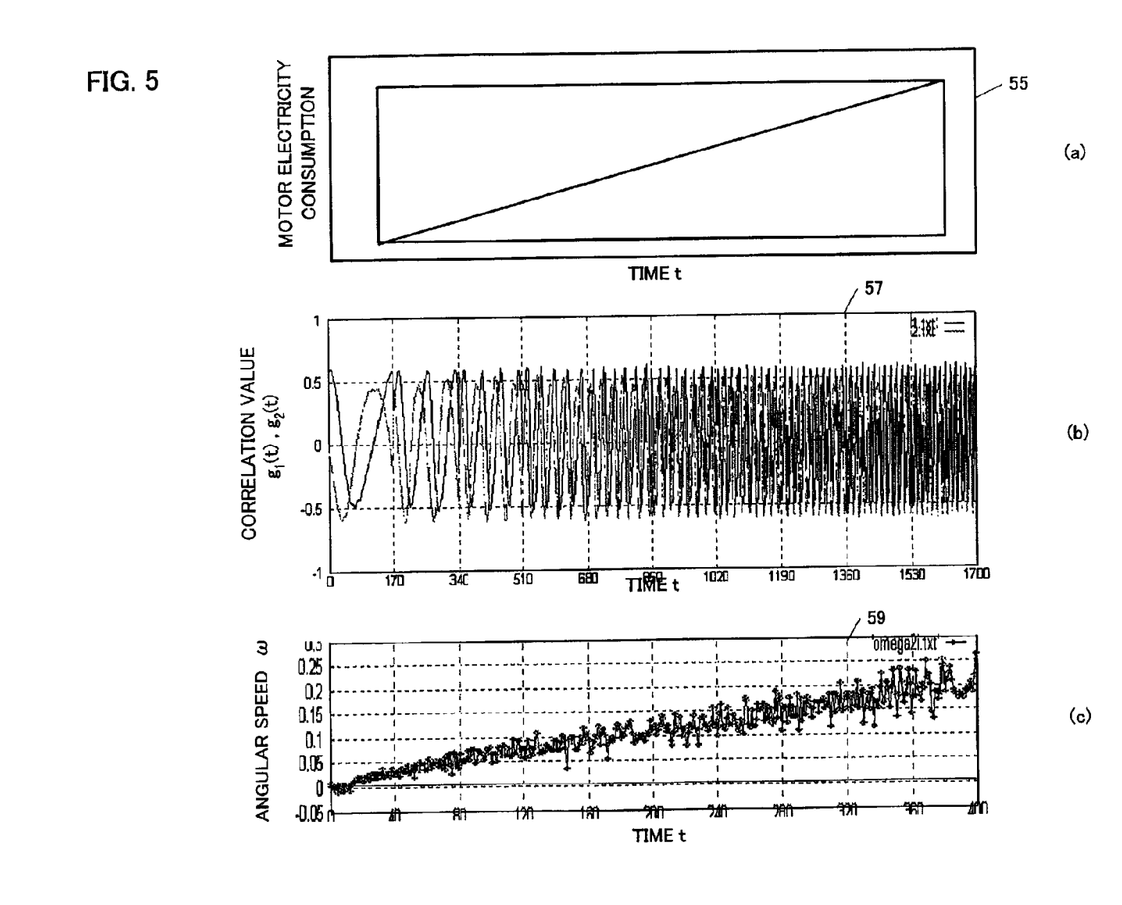
FIG. 5(a) is a graphical chart of the electric power consumed by the motor.
FIG. 5(b) is a graphical chart of the correlation value.
FIG. 5(c) is a graphical chart showing the calculation result of the angular speed obtained by the system.

FIG. 5 shows the result of the angular speed calculations using the motion information recognition system according to the invention. FIG. 5(a) shows a graph in which the electric power consumed by the motor connected to the recognized object 11 are plotted relative to the time t. FIG. 5(a) corresponds to the rotation speed of the object 11 because the rotation speed increases proportionally to the increase of the electric power consumed by the motor. In FIG. 5(b), the calculation results of the inner product calculation block 25 are plotted relative to the time t. As seen, the oscillation cycles of the correlation values $g_1(t)$, $g_2(t)$ increase as the electric power consumed by the motor increases. In FIG. 5(c), the angular speeds calculated by the angular speed calculation block 27 from the calculation results by the inner product calculation block 25 are plotted relative to the time t. As seen, the angular speed ω increases as the electric power consumed by the motor increases. It is possible in this embodiment to calculate the angular speeds in the range of 0 rpm to 326 rpm corresponding to the learned images. In addition, the rotation direction can be obtained from the sign of the angular speed ω. If the sign is positive, the object moves in a counterclockwise direction and otherwise it moves in a clockwise direction.

Figure 6:
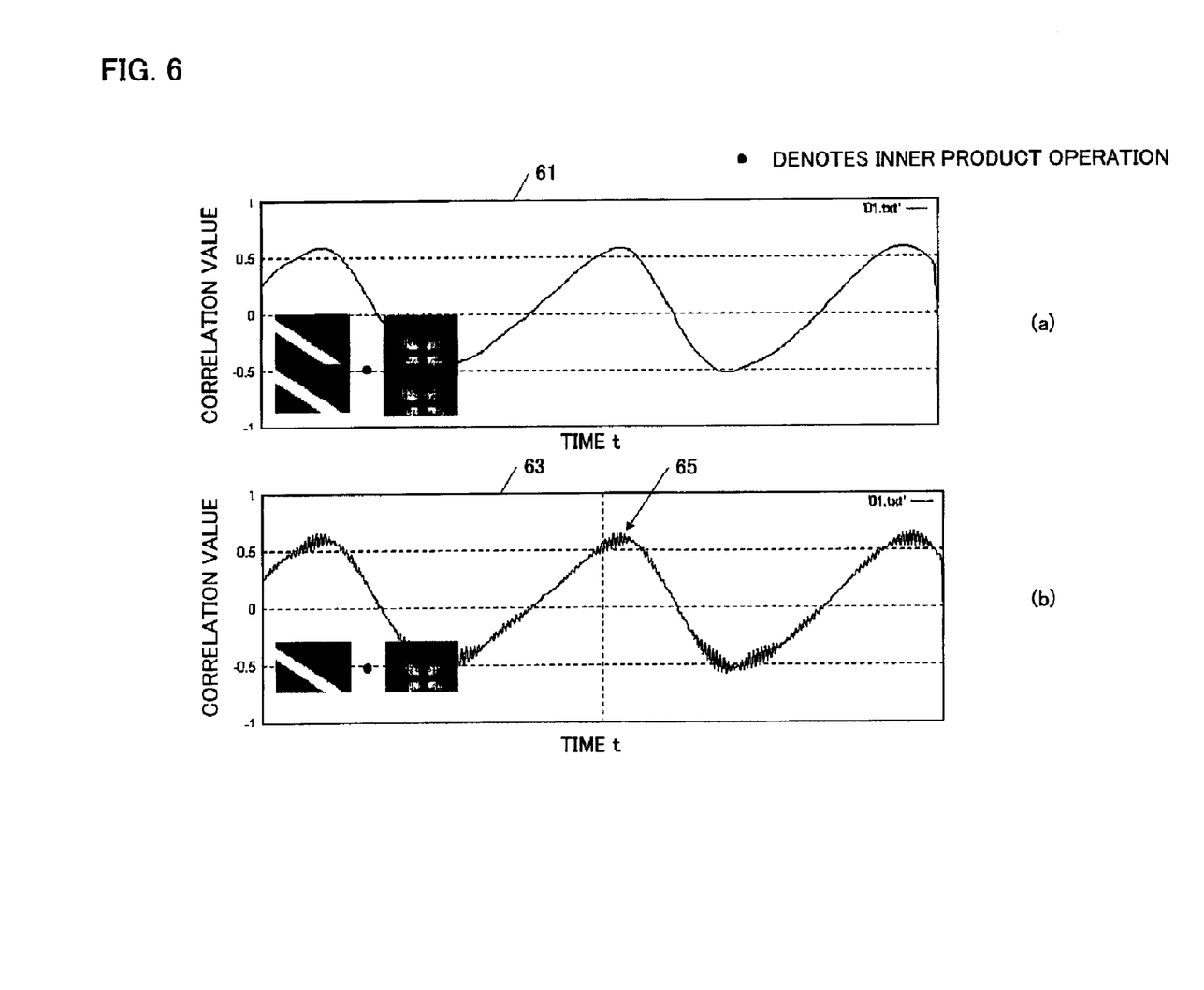
FIG. 6(a) shows a graphical chart of correlation values calculated by two combined images in the learning and recognition processes.
FIG. 6(b) shows a graphical chart of correlation values calculated by only one image in the learning and recognition processes.

Now learned images and recognized images used in this system will be explained. As described before, a plurality of the time-series images acquired by the image capture block 19 are combined for each pair of the images that are successive in terms of time. The reason for such combination process will be described below with reference to FIG. 6.

FIG. 6(a) illustrates the correlation values calculated using the images combined as pairs, and FIG. 6(b) illustrates the correlation values calculated using the individual images which are not combined. When uncombined images are used, some jagged parts appear, where the correlation values cannot be differentiated. In contrast, the curve of the correlation values is so smooth to perform the correct differentiation calculation. This is because the difference of the speed between the two images can be represented in one image in which two time-successive images are combined. So, it is possible to improve the accuracy of the correlation values through such image combination process. Although two successive images in terms of time are combined into one image in this embodiment, more than two images that are successive in terms of time may be combined into one image for representation of the motion information in one image.

Although the motion information of the object in the angular speed range from 0 rpm to 326 rpm has been recognized in this embodiment, the movement information recognition system according to the invention may recognize any movement information depending on the learned images in the learning process. This system may be applied to any field where the motion information recognition is needed by storing motion information data of various target objects in the database. Such application field includes visual assist for autonomous moving mobile robots, landing control for airplanes, posture control for helicopters, speed control for rotating objects, revolution control for vehicle wheels, control of pitch and roll for ships etc.

According to the invention, the storage capacity required for the system can be reduced because the information is stored as eigenvectors in database. The processing time of the system is short and the computing cost is low because the motion information is obtained through the direct inner product calculations between the eigenvectors and the recognized images. Furthermore, the accuracy of the obtained motion information is high because pair of images successive in terms of time combined into one image are used for operations.

What is claimed is:

1. A system for recognizing motion information of an object based on the images of said object, comprising:
    an imager for taking time-series images of rotating movement of the object;
    image capture means for capturing said time-series images of said object to generate image vectors representing rotating movement of said object;
    a primary component analyzer for obtaining, through principal component analysis, a plurality of eigenvectors of the image vectors of a sample object which are generated by said image capture means;
    a storage for storing said plurality of eigenvectors;
    inner product means for performing inner product operations between the image vectors of an object being recognized which are generated by said image capture means and said plurality of eigenvectors stored in said storage means; and
    calculation means for obtaining the motion information including angular speed and rotation direction of said object being recognized based on the result of said inner product operations.

2. The rotating movement recognition system as claimed in claim 1, wherein said image vectors of said sample object and said image vectors of said object being recognized are generated from at least two images which are successive in terms of time.

3. The rotating movement recognition system as claimed in claim 1, further comprising selection means for selecting the largest eigenvalue for a first eigenvector and the second largest eigenvalue for a second eigenvector.

4. The rotating movement recognition system as claimed in claim 3, wherein said calculation means, based on phase of a result $g_1(t)$ of the inner product operations between said image vectors of said object being recognized and said first eigenvector, and phase of a result $g_2(t)$ of the inner product operations between said image vectors of said object being recognized and said second eigenvector, obtains an angular speed of said object being recognized according to the following equation (a) when said $g_1(t)$ is delayed in phase relative to said $g_2(t)$:

$$\omega = \frac{d}{dt} g_1(t) / g_2(t); \tag{a}$$

and obtains an angular speed of said object being recognized according to the following equation (b) when said $g_1(t)$ is advanced in phase relative to said $g_2(t)$:

$$\omega = \frac{d}{dt} g_2(t) / g_1(t). \tag{b}$$

5. A computer program stored on a computer readable medium for recognizing rotating movement of an object based on the images of said object, being configured to:

take time-series images of rotating movement of said object;

generate learned image vectors representing rotating movement of said object from said time-series images of said object;

obtain, through principal component analysis, a plurality of eigenvectors of the learned image vectors;

store said plurality of eigenvectors;

perform inner product operations between the image vectors of a recognized object and said plurality of eigenvectors stored in said storage means; and obtain the motion information including angular speed and rotation direction of said object being recognized based on the result of said inner product operations.

6. The computer program stored on a computer readable medium as claimed in claim 5, being further configured to generate said image vectors of said sample object and said image vectors of said object being recognized from at least two images which are successive in terms of time.

7. The computer program stored on a computer readable medium as claimed in claim 5, being further configured to select the largest eigenvalue for a first eigenvector and the second largest eigenvalue for a second eigenvector.

8. The computer program stored on a computer readable medium as claimed in claim 7, being further configured to, based on phase of a result of the inner product operations between said image vectors of said object being recognized and said first eigenvector and the result of the inner product operations between said image vectors of said object being recognized and said second eigenvector;

obtain an angular speed of said object being recognized according to the following equation (a) when said result for the first eigenvector is delayed in phase relatively to the result for the second eigenvector:

$$\omega = \frac{d}{dt} g_1(t) / g_2(t); \tag{a}$$

and obtain an angular speed of said object being recognized according to the following equation (b) when said result for the first eigenvector is advanced in phase relatively to the result for the second eigenvector:

$$\omega = \frac{d}{dt} g_2(t) / g_1(t). \tag{b}$$

9. A method for recognizing the motion information of an object based on the images of said object, comprising:

taking time-series images of an moving object;

generating learned image vectors representing rotating movement of said object from said time-series images of said object;

obtaining, through principal component analysis, a plurality of eigenvectors of the learned image vectors;

storing said plurality of eigenvectors;

performing inner product operations between the image vectors of said object being recognized and said plurality of eigenvectors stored in said storage means; and obtaining the motion information including angular speed and rotation direction of said object being recognized based on the result of said inner product operations.

10. The method as claimed in claim 9, further comprising generating said image vectors of said sample object and said image vectors of said object being recognized from at least two images which are successive in terms of time.

11. The method as claimed in claim 9, further comprising selecting the largest eigenvalue for a first eigenvector and the second largest eigenvalue for a second eigenvector.

12. The method as claimed in claim 11, further comprising, based on phase of a result of the inner product operations between said image vectors of said object being recognized and said first eigenvector and the result of the inner product operations between said image vectors of said object being recognized and said second eigenvector;

obtaining an angular speed of said object being recognized according to the following equation (a) when said result for the first eigenvector is delayed in phase relatively to the result for the second eigenvector:

$$\omega = \frac{d}{dt} g_1(t) / g_2(t); \tag{a}$$

and obtaining an angular speed of said object being recognized according to the following equation (b) when said result for the first eigenvector is advanced in phase relatively to the result for the second eigenvector:

$$\omega = \frac{d}{dt} g_2(t) / g_1(t). \tag{b}$$

* * * * *